Dec. 13, 1966    H. O. WALKER    3,291,146
AUTOMATIC CONTROL SYSTEMS FOR STARTING-UP AND
SHUTTING-DOWN TURBINES
Filed Feb. 26, 1963    2 Sheets-Sheet 1

Inventor
*Herbert Oswald Walker*

By
*Fred L. Witherspoon Jr.* Attorney

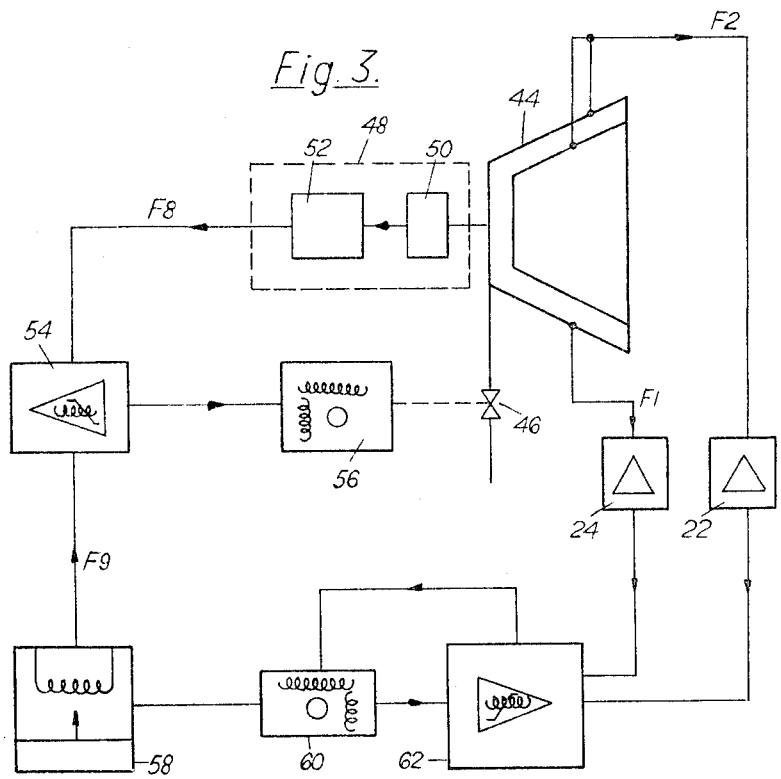
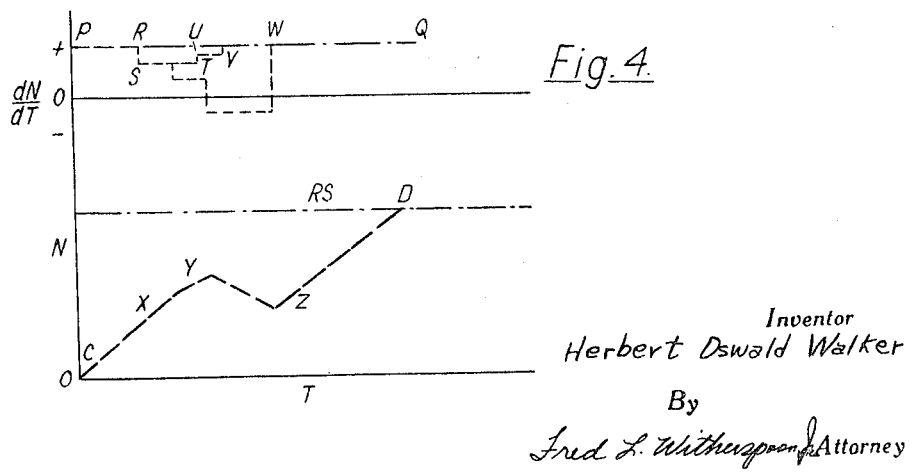

United States Patent Office 3,291,146
Patented Dec. 13, 1966

3,291,146
AUTOMATIC CONTROL SYSTEMS FOR STARTING-UP AND SHUTTING-DOWN TURBINES
Herbert Oswald Walker, West Hartlepool, England, assignor to Richardsons, Westgarth & Co. Limited, Wallsend, England
Filed Feb. 26, 1963, Ser. No. 261,046
Claims priority, application Great Britain, Feb. 28, 1962, 7,885/62
9 Claims. (Cl. 137—17)

This invention relates to temperature-sensitive control systems for regulating the starting-up or shutting-down of machines and installations which operate at an elevated temperature, and is particularly applicable to the control of steam turbines.

The starting-up of large steam turbines is frequently controlled through an automatic control system which regulates the operation of the turbine up to the point where the normal running control gear takes over. During this starting-up period the temperature within the turbine rises from ambient temperature to the normal operating temperature. It is important to ensure that the rate at which the temperature rises or the temperature differential between different parts of the machine is not so great as to cause damage to the machine, and the aim of the present invention is to provide a control system which meets this requirement.

According to the invention, an automatic control system for controlling the starting-up or shutting-down of a machine or installation which operates at an elevated temperature comprises temperature-sensitive means arranged to produce a signal dependent on a temperature differential in the machine or installation or the rate at which a temperature therein is changing, and an adjusting device connected to programme apparatus which determines the starting-up or shutting-down programme, the arrangement being such that, should the signal fall outside a predetermined limit, the programme apparatus is automatically adjusted by the adjusting device to a new programme which so influences the operation of the machine or installation as to bring the signal back to within that limit.

In order that the invention may be thoroughly understood, an example of an automatic control system in accordance with it will now be described with reference to the accompanying drawings, in which:

FIGURES 2 and 3 are similar views of the control system shown in FIGURE 1 combined with other control apparatus; and FIGURE 4 is a graph illustrating the actual and intended speed and acceleration of a steam turbine under the control of the apparatus shown in FIGURE 3.

Figure 1:
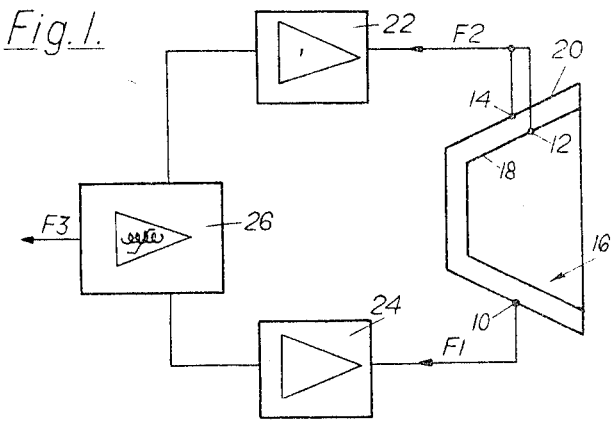
FIGURE 1 is a diagrammatic layout of the control system itself.

The basic components of a temperature-sensitive control system in accordance with the invention are shown in FIGURE 1. From this figure it will be seen that temperature-measuring instruments 10, 12 and 14 are provided at three places on the turbine 16, the instrument 10 being used to measure the absolute temperature of the turbine casing, while the other two instruments 12 and 14 measure the differential temperature across the inner and outer walls 18 and 20 of the turbine casing. The instruments produce electrical signals F1 and F2 which correspond respectively to the above-mentioned absolute temperature and differential temperature, and these signals are fed through separate transistor amplifiers 22 and 24 to a servo 26. The servo produces an electrical output signal F3 which is dependent upon the rate of change of F1 and the value of F2. The output signal F3 can thus be used to adjust directly or indirectly such apparatus as will cause the temperature of the turbine to be brought back to an acceptable value.

Figure 2:
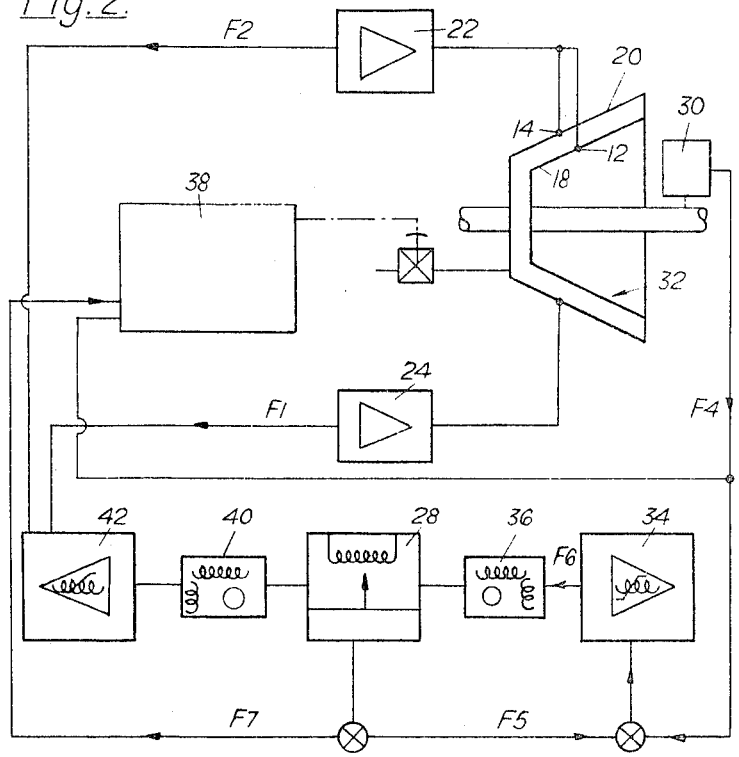

FIGURE 2 shows the application of the control system shown in FIGURE 1 to the turbine starting system described in United States Patent No. 3,226,558, issued December 28, 1965. This particular form of starting system has a speed-programme device 28 in the form of a variable ratio transformer which is adjusted to take into account temporary departures of the turbine speed from its intended value. A speed-sensitive device 30 arranged on or near the steam turbine 32 being controlled serves to feed an electrical signal F4 proportional to or dependent on the actual speed of the turbine shaft back to a time speed servo 34 which compares it with a reference signal F5 received from the time base 28. The signal F5 represents the intended speed of the turbine shaft at any instant, and provided the relationship between the two signals F4 and F5 is such that the actual speed of the turbine shaft is not substantially different from its intended speed, the servo 34 will remain out of action. If, however, the differences between the two signals exceeds a predetermined amount, the time speed servo 34 will supply a signal F6 to a time speed servo motor 36 which serves to reverse the time base 28. In this way, the signal F5 representing the intended speed of the turbine will be adjusted to a new value which brings the actual speed within the permissible deviation from the adjusted speed programme.

The control system of FIGURE 2 also includes apparatus 38 of conventional construction which controls the steam supply to the turbine 32 in accordance with the signal F7 received from the time base 28, and has a time base servo motor 40 under the control of a time base servo 42. In accordance with the present invention, this servo 42 is supplied with signals F1 and F2 in the same way as the servo 26 shown in FIGURE 1. Thus, should the temperature signals F1 and F2 rise to such a value as to indicate that the turbine is heating up too quickly or that the temperature differential in the casing is becoming too large, the servo 42 will produce a signal F3 which slows down or reverses the time base 28 with the result that the speed programme is slowed down. This in turn will bring down the temperature in the turbine to an acceptable level.

FIGURES 3 and 4 illustrate the application of the control system shown in FIGURE 1 to another form of turbine starting system which is described in our co-pending patent application Serial No. 261,143, filed February 26, 1963. The system described in that patent application is included in the accompanying FIGURE 3, and comprises a turbine 44 which is supplied with steam through a valve 46. The system comprises acceleration-sensitive means 48 constructed to measure the actual acceleration of the turbine shaft and produce a signal F8 which is dependent on the acceleration thus measured. This is achieved by using a speed-sensitive device 50 which measures the speed of the turbine shaft and feeds a signal dependent on that speed into a differentiator 52 which converts it into the acceleration signal F8. The signal is then supplied to a servo 54 where it is compared with a signal F9 representing the desired or intended acceleration. Depending on the ratio of the two signals, the servo 54 adjusts the position of the valve 46 through a servo motor 56 so as to maintain the actual acceleration of the turbine at the intended value.

The signal F9 is not constant, but is produced by a variable output device 58, such as a variable ratio transformer, which can be adjusted to vary the magnitude of the signal F9 by a servo motor 60 controlled by a servo 62. This servo is fed with signals F1 and F2 representing the rate of temperature rise of the turbine casing and the differential temperature between its inner and outer walls in the same way as the servo 26 shown in FIGURE 1. Thus, should the rate of temperature increase or the temperature difference indicated by the signal F1 or F2 become excessive, the servo motor 60 operates to adjust the signal F9 so as to decrease, and possibly to make negative, the permissible acceleration.

FIGURE 4 shows how the turbine 44 might operate under this form of control. The line PQ represents the maximum permissible acceleration, and the turbine speed first follows the line CX. However, at temperature R the operating conditions become such that the allowable acceleration is reduced and follows the line RSTUVW until it returns at W to the original maximum value as specified by the line PQ. The turbine speed at first follows the line CX in accordance with the acceleration PQ, but when the acceleration is restricted at R, it proceeds to follow the line XY. At Y a shortage of steam occurs and the speed lags along the line YZ. At Z the steam supply is restored, and the original acceleration PQ is again resumed at the point W until the speed reaches the point D on the line RS which represents the running speed of the machine. The way in which the actual acceleration of the turbine departs from the desired value is indicated by the dotted line in the upper part of FIGURE 4. If at Z there had still been a restriction on acceleration due to temperature effects, then the turbine acceleration would have followed the thus-restricted value until the restriction had been removed.

The advantage therefore of applying the present invention to that described in our co-pending patent application Serial No. 261,143, filed February 26, 1963, is that it becomes possible to accelerate the turbine more rapidly, as any undue rise in temperature is catered for by the control system which feeds the signals F1 and F2 into the servo 62.

I claim:

1. An automatic control system for controlling the starting-up or shutting-down of a machine or installation which operates at an elevated temperature, for example a steam turbine, comprising temperature-measuring means arranged to measure the temperature differential between the inner and outer surfaces of the casing wall, means for measuring the absolute temperature of the casing wall, said temperature measuring means adapted to produce a first signal and a second signal representative of the temperature differential and of the absolute temperature respectively, servo means operatively connected with said temperature measuring means for receiving said signals, said servo means being capable of producing a third signal which is dependent upon the value of said first signal and the rate of change of said second signal, and means controlling the starting-up or shutting-down of the machine operated in response to said third signal.

2. An automatic control system for controlling the starting-up or shutting-down of a machine or installation which operates at an elevated temperature, for example a steam turbine, comprising temperature-measuring means arranged to measure the temperature differential between the inner and outer surfaces of the casing wall, means for measuring the absolute temperature of the casing wall, said temperature measuring means adapted to produce a first signal and a second signal representative of the temperature differential and of the absolute temperature respectively, servo means operatively connected with said temperature measuring means for receiving said signals, said servo means being capable of producing a third signal which is dependent upon the value of said first signal and the rate of change of said second signal, means for measuring the speed of said turbine and to produce a fourth signal representative thereof, means for producing a fifth signal representative of the desired speed of the turbine, servo means for receiving said fourth and fifth signals and comparing the two, said servo means being capable of producing a sixth signal representative of any appreciable difference between said fourth and fifth signals, and speed control means operative in response to said sixth signal and said third signal to control the speed of said turbine.

3. An automatic control system for controlling the starting-up or shutting-down of a machine or installation which operates at an elevated temperature, for example a steam turbine, comprising temperature-measuring means arranged to measure a temperature differential between the inner and outer surfaces of the casing wall, means for measuring the absolute temperature of the casing wall, said temperature measuring means adapted to produce a first signal and a second signal representative of the temperature differential and of the absolute temperature respectively, servo means operatively connected with said temperature measuring means for receiving said signals, said servo means being capable of producing a third signal which is dependent upon the value of said first signal and the rate of change of said second signal, means for measuring the acceleration of said turbine and to produce a fourth signal representative thereof, means for producing a fifth signal representative of the desired acceleration of the turbine, servo means for receiving said fourth and fifth signals and comparing the two, said servo means being capable of producing a sixth signal representative of any appreciable difference between said fourth and fifth signals, and acceleration control means operative in response to said sixth signal and said third signal to control the acceleration of said turbine.

4. An automatic control system for controlling the starting up of a machine which operates at an elevated temperature, comprising temperature-measuring means at a selected region of the machine and producing a first signal which is a function of the temperature at said selected region, amplifying means receiving and amplifying said first signal, an adjustable programmer having a control input and generating as output a variable second signal representative of the desired value of a selected operating characteristic of the machine as a function of time, a sensor on the machine delivering a third signal representative of the actual value of said operating characteristic, a machine controller having control signal input means and connected in controlling relationship to the machine to vary the machine operation, means applying said second and third signals to said input means of said controller whereby the controller acts on the machine tending to reduce to zero any difference between said second and third signals, and servo motor means having the amplified first signal applied to its input and having its output connected to said control input of the programmer thereby to adjust the programmer in a manner to decrease the difference between said second and third signals in the event that said first signal passes outside a selected limit.

5. A system according to claim 4, applied to a steam turbine having a turbine casing, and comprising a casing temperature sensor delivering a signal representative of absolute turbine casing temperature, differential temperature-sensing means delivering a signal representative of the temperature differential between the inner and outer walls of the turbine casing, means differentiating said absolute turbine casing temperature signal to obtain a signal representative of rate of change of said signal, and means responsive to said rate of change signal and said temperature differential signal to derive the aforesaid first signal.

6. An automatic control system for controlling the starting-up of a machine which operates at an elevated temperature, comprising temperature-measuring means at a selected region of the machine and producing a first signal which is a function of the temperature at said selected region, amplifying means receiving and amplifying said first signal, an adjustable programmer having a control input and generating as output a variable second signal representative of the desired value of a selected operating characteristic of the machine as a function of time, a machine controller having control signal input means and connected in controlling relationship to the machine to vary the machine operation, means applying said second signal to said input means of said controller, and servo motor means having the amplified first signal applied to its input and having its output connected to said control input of the programmer thereby to adjust the programmer in a manner to decrease the difference between said second and third signals in the event that said first signal passes outside a selected limit.

7. An automatic control system for controlling the starting-up of a machine which operates at an elevated temperature, comprising temperature-measuring means at a selected region of the machine and producing a first signal which is a function of the temperature at said selected region, amplifying means receiving and amplifying said first signal, an adjustable programmer having a control input and generating as output a variable second signal representative of the desired value of output speed of the machine as a function of time, a sensor on the machine delivering a third signal representative of the actual value of output speed, a machine controller having control signal input means and connected in controlling relationship to the machine to vary the machine speed, means applying said second and third signals to said input means of said controller whereby the controller acts on the machine tending to reduce to zero any difference between said second and third signals, and servo motor means having the amplified first signal applied to its input and having its output connected to said control input of the programmer thereby to adjust the programmer in a manner to decrease the difference between said second and third signals in the event that said first signal passes outside a selected limit.

8. A system according to claim 7, further comprising comparator means receiving as inputs said second and third signals and delivering a fourth signal representative of their difference, and second servo motor means receiving said fourth signal as input and having its output coupled to said programmer thereby to adjust the programmer and change the value of said second signal in the direction to reduce the difference between said second and third signals in the event that said fourth signal representing said difference exceeds a predetermined amount.

9. An automatic control system for controlling the starting-up of a machine which operates at an elevated temperature, comprising temperature-measuring means at a selected region of the machine and producing a first signal which is a function of the temperature at said selected region, amplifying means receiving and amplifying said first signal, an adjustable programmer having a control input and generating as output a variable second signal representative of the desired value of machine output acceleration as a function of time, a sensor on the machine delivering a third signal representative of the actual value of output acceleration, a machine controller having control signal input means and connected in controlling relationship to the machine to vary the machine speed, means applying said second and third signals to said input means of said controller whereby the controller acts on the machine tending to reduce to zero any difference between said second and third signals, and servo motor means having the amplified first signal applied to its input and having its output connected to said control input of the programmer thereby to adjust the programmer in a manner to decrease the difference between said second and third signals in the event that said first signal passes outside a selected limit.

References Cited by the Examiner
UNITED STATES PATENTS

| 2,829,662 | 4/1958 | Carey | 137—36 X |
| 3,075,537 | 1/1963 | Puster | 137—16 |

WILLIAM F. O'DEA, *Primary Examiner.*

CLARENCE R. GORDON, *Examiner.*